United States Patent [19]

Morrison

[11] Patent Number: 4,919,253

[45] Date of Patent: Apr. 24, 1990

[54] BEARING LUBRICATION SYSTEM

[75] Inventor: Thomas E. Morrison, Guin, Ala.

[73] Assignee: Continental Conveyor & Equipment Company, Inc., Winfield, Ala.

[21] Appl. No.: 202,454

[22] Filed: Jun. 6, 1988

[51] Int. Cl.⁵ .............................................. B65G 39/00
[52] U.S. Cl. .................................... 198/501; 198/830; 384/474
[58] Field of Search ............... 198/501, 830; 184/15.1; 384/473, 474, 389, 390

[56] References Cited

U.S. PATENT DOCUMENTS

| | | | |
|---|---|---|---|
| 2,285,647 | 6/1942 | Deems et al. | 384/474 |
| 2,570,364 | 10/1951 | Mercier | 198/501 |
| 3,198,318 | 8/1965 | Brown | 198/501 X |
| 3,259,227 | 7/1966 | Steinmetz | 198/501 |
| 4,174,031 | 11/1979 | MacLeod | 198/501 |
| 4,186,831 | 2/1980 | Mercurio et al. | 198/501 |
| 4,228,889 | 10/1980 | Garrison | 198/501 |

FOREIGN PATENT DOCUMENTS

| | | | |
|---|---|---|---|
| 0138922 | 6/1949 | Australia | 198/830 |
| 0855054 | 11/1970 | Canada | 198/501 |
| 1960304 | 6/1971 | Fed. Rep. of Germany | 198/501 |
| 2315046 | 3/1973 | Fed. Rep. of Germany | 198/501 |

Primary Examiner—David A. Bucci
Assistant Examiner—James R. Bidwell
Attorney, Agent, or Firm—Pearne, Gordon, McCoy & Granger

[57] ABSTRACT

An idler roll assembly for conveyors is provided which is particularly adapted for one-shot lubrication. The assembly includes roll mounting bearings having inner races which are mounted on a tubular roll mounting shaft and inner and outer grease seals which define a bearing chamber. Lubricant is admitted to the bearing chamber from a bore in the tubular roll mounting shaft and through a radial passageway which communicates with another passageway defined by the inner bearing race and a channeled portion of the shaft. The outer grease seal is a labyrinth seal comprising a first labyrinth portion fixed with respect to the roll and a second labyrinth portion fixed with respect to the shaft. A grease release lubricant passage is defined between the second labyrinth portion and the shaft.

14 Claims, 3 Drawing Sheets

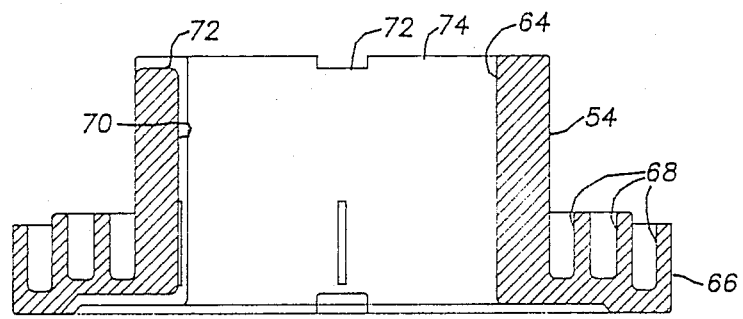
Fig. 5
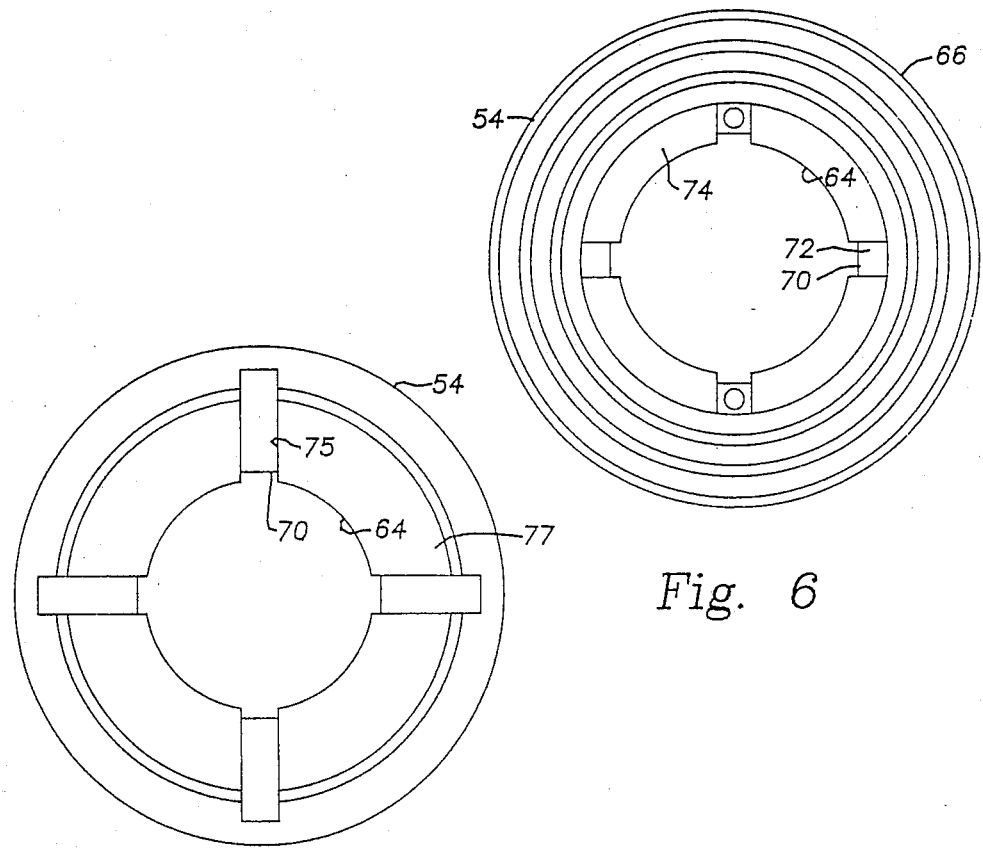
Fig. 6
Fig. 7

BEARING LUBRICATION SYSTEM

BACKGROUND OF THE INVENTION

This invention relates to bearing lubrication systems and, more particularly, to bearing lubrication systems for conveyor idler roll assemblies wherein a roll element is mounted on bearings to rotate with respect to its mounting shaft or spindle.

Properly maintained bulk conveyor idler rolls often last 20 years or more. The service life of a roll usually depends upon the life of the antifriction bearing mounting the roll on its shaft. Bearing life may sometimes be increased by relubrication, since relubrication replenishes lubricant available to the bearing and purges contaminants from the bearing area by the introduction of fresh, clean lubricating grease.

To ensure that all bearings are relubricated, it is desirable to grease each bearing individually. While individual bearing greasing operations are possible, at least on one side of flat return and conveying idler roll assemblies, the configuration of troughing idler roll assemblies limits direct accessibility to the two outside bearings on the idler roll wings only, and often the conveyor structure provides access to only one side of the conveyor so that only one bearing area can be reached for lubrication.

Thus, in a typical troughing idler assembly, the trough is formed by a horizontal idler roll and two inclined wing idler rolls so that the assembly includes six bearings. Therefore, two of the bearings are directly accessible and, in some cases, only one of the bearings on one side of the conveyor can be reached.

In order to eliminate the problem of access to lubrication fittings, idler rolls have been designed so that direct access is provided to each bearing to be lubricated by tubing and the tubes lead from each bearing to a convenient access station at one side of the conveyor. In this instance, six fittings would be arranged in a group for access. The additional lube lines add significant additional cost to a high volume competitive product, and the user often views the number of fittings to be indicative of his lubrication maintenance cost.

PRIOR ART

In view of the foregoing problems, manufacturers of idler rolls assemblies have designed "one-shot" lubrication systems wherein each assembly, consisting of a plurality of rolls, has a single fitting through which all of the roll bearings are lurbicated. In general, these arangements includes a grease passage which is defined by an axial bore through the roll mounting spindle and then through a radially extending bore through the wall of the spindle to a zone adjacent the bearing. The grease is confined in the region of the bearing by a rear grease seal and an external seal. These seals are designed to retain the grease in the bearing, but to permit the grease to be displaced by fresh incoming grease. The obvious engineering problem with "one-shot" lubrication systems is that in view of the significant pressure drop between the nearest bearing and the most remote bearing, there is a tendency for all of the grease to come out at the nearest bearing or the seals being ruptured from the extreme pressure required to serve the most remote bearing.

Each manufacturer of a "one-shot" idler roll assembly has proposed to handle this problem with one of three basic approaches. The first approach is to connect the bearings in a series path, with no exit for the grease until the grease has traveled through the most distant bearing. An example of this approach may be found in U.S. Pat. No. 3,334,727, granted to Rieser. According to the Rieser patent, the lubricant introduced through a single fitting at one end of a plurality of idler rolls travels through the end of a hollow shaft until it reaches a plug in the shaft. The lubricant then travels through a cross-drilled hole located behind a first bearing, through the bearing, and re-enters the hollow shaft on the other side of the plug.

In other prior art arrangements, the lubricant is introduced through a single fitting, travels down a bore drilled in the end of a solid shaft, exits through a cross-drilled hole behind the first bearing, travels down the outside of the shaft to a hole drilled inside the second bearing, back into the shaft, to exit through a flexible connecting tube into the second shaft, where it follows a similar path until it exits the last shaft through a relief fitting.

Idler roll bearings which are connected in series of lubrication may have a relatively short life, since dirty grease from one bearing may eventually be forced inside a more distant bearing in the series. Furthermore, since the seals inside each bearing must stop and force the lubricant onto the next bearing, high volume and high pressure greasing operations may rupture the seals.

Further problems are that worn seals may fail to block the grease, and surfaces that normally clear or lightly contact may be pressed hard against each other by lubricant pressure, thereby locking the roll until pressure is released.

A still further problem with these arrangements is that dirty lubricant cannot be purged and replaced by new lubricant in each bearing, since the lubricant must travel in small increments along its path until it reaches the last bearing.

The second approach to "one-shot" idler lubrication mentioned above is exemplified by U.S. Pat. Nos. 1,958,412; 3070,219; 3,338,381; and 3,406,438. Generally, these patents eliminate the problem of dirty grease contamination of a bearing from upstream bearings, but do not overcome the problems of ruptured seals, roll locking, and replacement of contaminated lubricant with new lubricant in each bearing.

The third-mentioned "one-shot" lubrication technique is the more widely accepted technique today, since the lubricant is metered to ensure that each bearing receives a proper share and supply of lubricant. Examples of this approach may be found in U.S. Pat. Nos. 3,797,609; 3,892,306; 3,984,160; and 4,171,031. According to these prior art patents, lubricant is metered to each bearing by constricting the entrance to or the exit from each bearing cavity. The preferred technique is to restrict lubricant entrance to the bearing in order to avoid pressure buildup in the bearing cavity with the possibility of rupturing the bearing seal and/or locking the idler roll. In U.S. Pat. No. 3,797,609, lubricant is metered into the bearing cavity by employing long, slender, flexible compensating tubes which provide a predetermined pressure drop in the bearing cavity. A greater pressure drop may be provided at those bearing cavities which are proximate to the lubricant pressure source.

In U.S. Pat. No. 4,174,031, the patentee describes how the desired pressure drop may be accomplished by employing a small entrance hole through the shaft to the bearing cavity. This hole is described as being 0.052 inch or less in diameter. In actual practice, this small orifice is provided by small steel roll pins inserted in relatively large holes to provide the required pressure drop, since it is virtually impossible to drill 0.052-inch holes in a cylindrical shaft of any substantial wall thickness without breaking drill bits. Furthermore, it is extremely difficult to insert roll pins into small holes, since the small pins are hard to handle and the small holes are difficult to locate. This is an expensive assembly operation to automate. Similarly, the assembly of compensating tubes, such as those described in U.S. Pat. No. 3,797,600, is expensive and time-consuming.

SUMMARY OF THE INVENTION

This invention provides a "one-shot" lubricating system for idler rolls which overcomes the problems associated with the prior art systems. According to this invention, lubricant is metered into each bearing cavity from the interior of a hollow roll mounting shaft by providing a cross-hole from the hollow interior of the shaft to a location beneath the inner race of a roll bearing. The path of travel of the lubricant is continued to the bearing cavity along a flat milled on the surface of the cylindrical roll. The effective cross-sectional area of the path which includes the cross hole and the milled flat may be varied by varying the depth of cut of the milled flat, by providing a spiral path on the cylindrical shaft which is covered by the inner race of the bearing, or any other path configuration defined by and between the inner bearing race and the particular surface configuration of the roll mounting shaft.

Advantageously, the portion of the path defined by the inner bearing race and the outer surface of the shaft may be formed by automated machining techniques. Moreover, it is much easier to start the cross hole drilling operation on a flat surface as opposed to a cylindrical surface, as is shown in the prior art.

A further aspect of the present invention is the provision of a labyrinth seal to keep contaminants out of the bearing cavity. An alternate grease passage bypasses the labyrinth seal to permit purging of the bearing while preventing excessive pressure in the bearing cavity which may blow the seals or lock the rolls.

BRIEF DESCRIPTION OF THE DRAWINGS

FIG. 5 is a cross-sectional view of one cooperating member of a labyrinth seal according to this invention;

FIG. 6 is an elevational end view of the seal illustrated in FIG. 5; and

FIG. 7 is an elevational view of the other end of the seal illustrated in FIGS. 5 and 6.

DETAILED DESCRIPTION OF THE INVENTION

Figure 1:
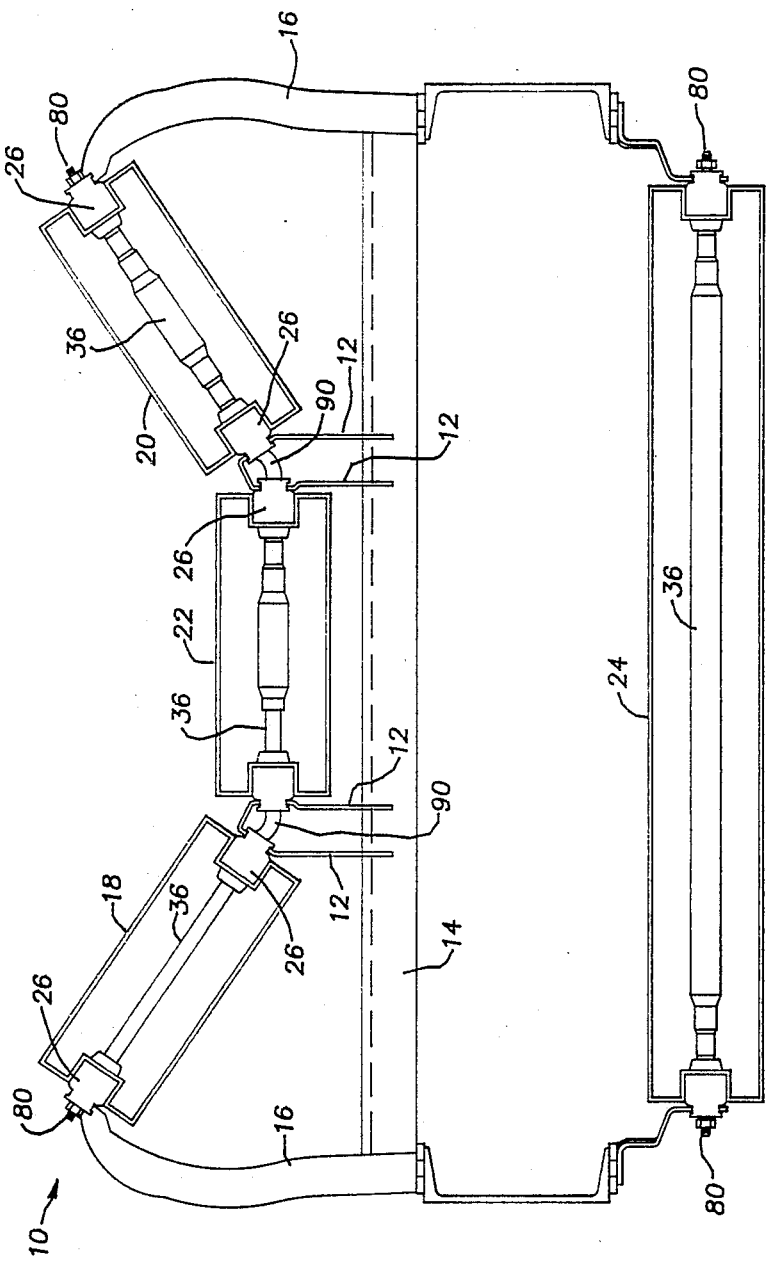
FIG. 1 is a cross-sectional view of an idler roll assembly for belt conveyors according to this invention.

Referring now to the drawings, and particularly to FIG. 1, an idler roll assembly 10 is illustrated. The assembly 10 includes a pair of carrier frame members or brackets 12 mounted on an inverted angle base 14 which ties the brackets 12 together and which has roll support frame members 16 welded thereto. Three idler rollers or roll cylinders consisting of wing-mounted rollers 18 and 20 and an interposed, horizontal roller 22 are mounted on the frame members 12 and, as to one end of the wing rollers 18 and 20, mounted on the brackets 16.

The rollers 18, 20, and 22 are adapted to support a conveying belt (not shown) in a troughed configuration. The return reach of the belt is supported by a return idler roller 24 which is similar in construction to the rollers 18, 20, and 22, and will not be described in further detail.

Figure 2:
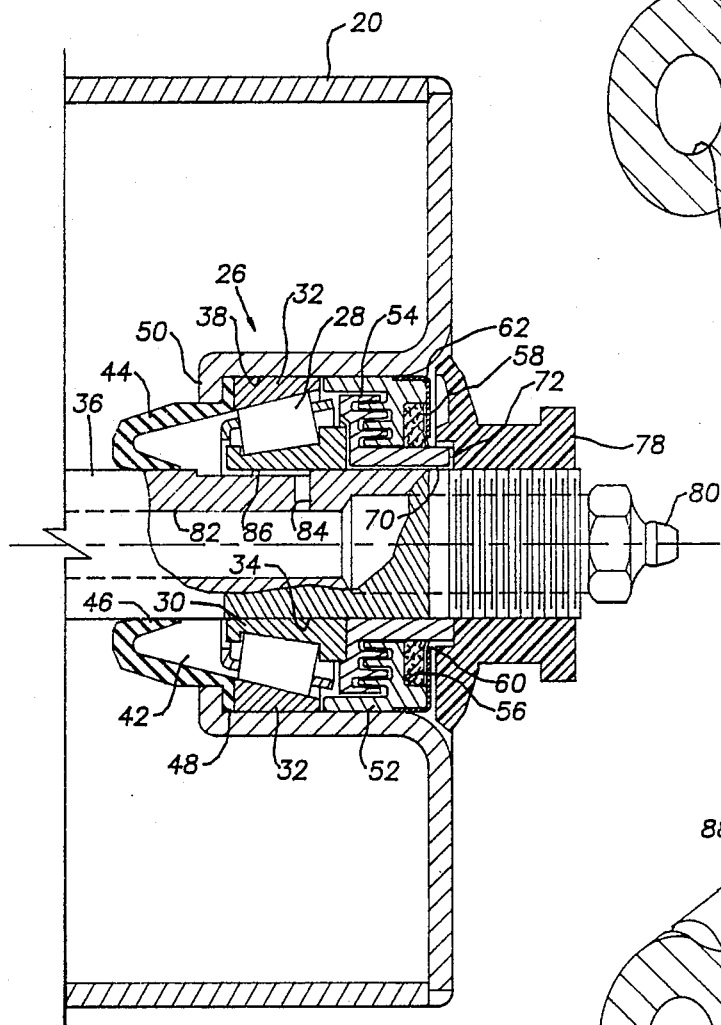
FIG. 2 is an enlarged view, partly in section, of one of the roll mounting end bearings.
Figure 3:
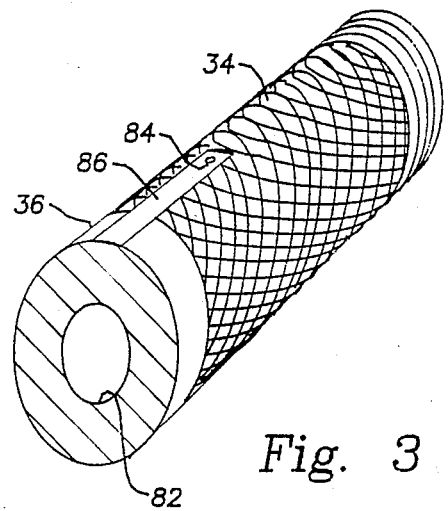
FIG. 3 is a framgentary, perspective view of one end of a roll mounting shaft, illustrating a portion of the lubricant path according to the preferred aspect of this invention.

Each idler roller 18, 20, 22, and 24 is provided with sealed bearing assemblies 26, one of which is shown in cross-sectional detail in FIG. 2. Referring now to FIG. 2 the bearing assembly 26 comprises automotive-type line contact, tapered roller bearings 28 which are mounted between inner and outer bearing races 30 and 32, respectively. The inner bearing race is press-fitted on a knurled portion 34 of a roll supporting shaft or spindle 36, while the outer race 32 is press-fitted within a cylindrical cup-shaped portion 38 of, for example, the supported roll 20.

A lubricant chamber 42 is defined at one end by a grease retainer or cup-shaped inner seal 44 which has an inner lip 46 in sliding contact with the shaft 36 and an outer annular flange 48 which is captured between the outer bearing race 32 and a lip 50 provided on the cup-shaped portion 38.

The chamber 42 is defined at the outer end by a triple horizontal labyrinth seal formed by an outer labyrinth member 52 and by an inner labyrinth member 54. The outer labyrinth member 52 has an annular recess 56 therein which receives an annular felt seal 58 and an outer nitrile seal 60 which are in sliding contact with the inner labyrinth member 54. The seals 58 and 60 are retained in the annular groove 56 by a cup-shaped retainer 62.

The inner labyrinth seal 54 is shown in greater detail in FIGS. 5, 6 and 7. As may be seen in FIGS. 5 through 7, the seal 54 has a cylindrical bore 64 which is adapted to be mounted on the shaft 36 and includes a flange 66 provided with labyrinth grooves 68. Axially extending lubricant grooves 70 are provided in the bore 64 and communicate with intersecting grooves 72 provided in an outer end face 74 of the seal 54. The grooves 70 also communicate with radial grooves 75 provided in an inner end face 77 of the seal 54 which abuts the inner race 30 of the bearing. Thus, it may be seen that grease or lubricant in the chamber 42 is largely trapped by the labyrinth seal, but the grooves 75, 70, and 72 provide a passageway which prevents excessive pressure in the bearing cavity, which may blow the seals or lock the rolls against rotation. The entire bearing assembly is retained by a bearing nut 78 which is threaded onto the end of the shaft 36 and which bears against the face 74 of the seal member 54.

Conventional grease fittings 80 are provided at the ends of each shaft 36, but it should be appreciated that only one such fitting may be employed for one-shot lubrication operations. By providing a fitting on both ends of the roll assembly, the user has a choice of lubrication stations as is convenient.

Figure 4:
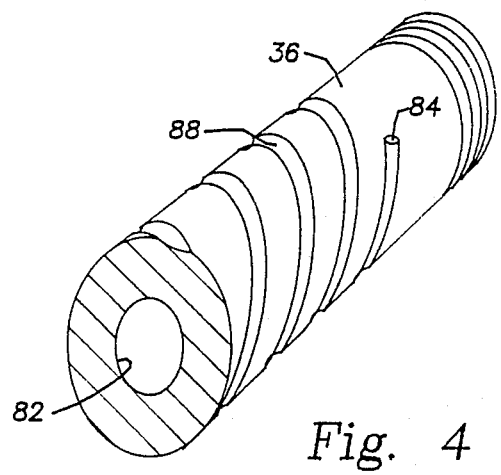
FIG. 4 is a fragmentary, perspective view of a roll shaft similar to FIG. 3 but showing an alternate configuration of the lubricant flow path.

Lubricant forced into a fitting 80 travels within an axial bore 82 in the shaft 36. In order to assure that an adequate supply of lubricant will be directed to the most remote bearing cavity 42, a passage is provided between the bore 82 and each bearing cavity 42, which ensures a sufficient pressure drop to prevent the lubrication of only those bearing cavities which are near the point of lubricant introduction. To this end, there is provided a radially extending passage 84 from the bore 82 to the inner cylindrical surface of the inner bearing race 30. The radial passage 84 is extended to communicate with the cavity 42 by a channeled portion of the cylindrical surface of the shaft 36 which, in the preferred embodiment, is a flat portion 86 of the shaft. Alternatively, this passage may be formed by a helical groove 88 cut in the surface of the shaft to increase the effective length of the passage and increase the pressure drop from the shaft bore to the bearing cavity. Such an arrangement is illustrated in FIG. 4. Other passageways may be provided by cutting a thread on the surface of the shaft 36. The flat portion 86 is presently preferred, since it may be formed by simple end milling techniques. The grease or lubricant is conducted from roll to roll by connecting tubes 90 (FIG. 1) which communicate between the bores 82 and which are fabricated from a suitable lubricant-resistant elastomer.

Although the preferred embodiment of this invention has been shown and described, it should be understood that various modifications and rearrangements of the parts may be resored to without departing from the scope of the invention as disclosed and claimed herein.

What is claimed is:

1. In an idler roll assembly for belt conveyors and the like having at least one roll mounted for rotation on a tubular shaft having an inner bore and an outer cylindrical surface by bearings, with an inner cylindrical surface of an inner race of said bearings being mounted on the outer cylindrical surface of said shaft, said tubular shaft having radially extending passages to provide a lubricant path from the inner bore of said shaft to said bearings, in combination therewith the improvement wherein said lubricant path is defined in part by said radially extending passage and is defined in part by an axially extending passage having a cross section in the shape of a circular segment which is in turn defined by a cylindrical portion of the inner surface of said bearing race and a planar portion of the surface of said shaft.

2. An idler roll assembly according to claim 1, wherein each bearing is mounted within a bearing cavity defined by a cup-shaped inner seal and an outer labyrinth seal.

3. An idler roll assembly according to claim 2, wherein said labyrinth seal comprises a first labyrinth member fixed to said idler roll and a second labyrinth member fixed to another portion of said shaft, and wherein lubricant passageway means is defined by and between said second labyrinth member and said another portion of said shaft.

4. In an idler roll assembly for conveyors and the like having at least one roll mounted for rotation on a tubular shaft having an inner bore and an outer cylindrical surface by bearings, with an inner cylindrical surface of an inner race of said bearings being mounted on the outer cylindrical surface of said shaft, said tubular shaft having radially extending passages to provide a lubricant path from the inner bore of said shaft to said bearings, in combination therewith the improvement wherein said lubricant path is defined in part by said radially extending passage and is defined in part by an axially extending passage which in turn is defined by the inner cylindrical surface of said bearing race and a channeled portion of the cylindrical surface of said shaft, said bearings being enclosed by a portion of said roll and by an inner grease seal between said portion of said roll and said shaft, and by an outer labyrinth seal comprising a first labyrinth portion fixed with respect to said roll and a second labyrinth portion fixed with respect to said shaft, and grease release lubricant passage means defined between said second labyrinth portion and said shaft.

5. In an idler roll assembly for conveyors and the like having at least one roll mounted for rotation on a tubular shaft having an inner bore and an outer cylindrical surface by bearings, with an inner cylindrical surface of an inner race of said bearings being mounted on the outer cylindrical surface of said shaft, said tubular shaft having radially extending passages to provide a lubricant path from the inner bore of said shaft to said bearings, in combination therewith the improvement wherein said bearings are enclosed by a portion of said roll and by an inner grease seal between said portion of said roll and said shaft, and by an outer labyrinth seal comprising a first labyrinth portion fixed with respect to said roll and a second labyrinth portion fixed to a portion of said shaft, and grease release lubricant passage means defined between said second labyrinth portion and said portion of said shaft.

6. An idler roll assembly according to claim 5, wherein said second labyrinth member includes means defining a central bore mounted on said portion of said shaft and wherein at least one axial groove in said bore comprises said lubricant passage means.

7. An idler roll assembly according to claim 6, wherein said second labyrinth member is provided with a face abutting said inner race of said bearing and wherein said lubricant passageway means further comprises at least one radially extending groove in said abutting face which communicates with said at least one axial passageway.

8. An idler roll assembly according into claim 7, including means defining an annular seal fixed to said first labyrinth member and in sliding engagement with said second labyrinth member.

9. In an idler roll assembly for belt conveyors and the like having at least one roll mounted for rotation on a tubular shaft having an inner bore and an outer cylindrical surface by bearings, with an inner cylindrical surface of an inner race of said bearings being mounted on the outer cylindrical surface of said shaft, said tubular shaft having radially extending passages to provide a lubricant path from the inner bore of said shaft to said bearings, in combination therewith the improvement wherein said lubricant path is defined in part by said radially extending passage and is defined in part by an axially extending passage which is in turn defined by a portion of the inner surface of said bearing race and a portion of the surface of said shaft, wherein each bearing is mounted within a bearing cavity defined by a cup-shaped inner seal and an outer labyrinth seal, said labyrinth seal comprising a first labyrinth member fixed to said idler roll and a second labyrinth member fixed to another portion of said shaft, said second labyrinth member together with said another portion of said shaft defining lubricant passageway means from said bearing, said second labyrinth member including means defininng a central bore mounted on said another portion of said shaft, and wherein at least one axial groove in said bore comprises said lubricant passageway means.

10. An idler roll assembly according to claim 9, wherein the portion of the surface of said shaft is a channeled portion of said shaft.

11. An idler roll assembly according to claim 10, wherein said channeled portion of said cylindrical surface comprises an axially extending planar surface.

12. An idler roll assembly according to claim 10, wherein said channeled portion of said cylindrical surface comprises a helical groove in said shaft.

13. An idler roll assembly according to claim 9, wherein said second labyrinth member is provided with a face abutting said inner race of said bearing and wherein said lubricant passageway means further comprises at least one radially extending groove in said abutting face with communicates with said at least one axial passageway.

14. An idler roll assembly according to claim 13, including means defining an annular seal fixed to said first labyrinth member and in sliding engagement with said second labyrinth member.

* * * * *

UNITED STATES PATENT AND TRADEMARK OFFICE
CERTIFICATE OF CORRECTION

PATENT NO. : 4,919,253

DATED : April 24, 1990

INVENTOR(S) : Thomas E. Morrison

It is certified that error appears in the above-identified patent and that said Letters Patent is hereby corrected as shown below:

Column 1, Line 47, "rolls" should read --roll--.

Column 1, Line 51, "arangements" should read --arrangements--.

Column 1, Line 51, "includes" should read --include--.

Column 2, Line 41, "3070,219" should read --3,070,219--.

Column 3, Line 51, "framgentary" should read --fragmentary--.

Column 6, Line 40, "into" should read --to--.

Column 6, Lines 65 and 66, "defininng" should read --defining--.

Signed and Sealed this

Twentieth Day of August, 1991

Attest:

HARRY F. MANBECK, JR.

*Attesting Officer*  *Commissioner of Patents and Trademarks*